United States Patent [19]
Maldonado

[11] Patent Number: 5,964,312
[45] Date of Patent: Oct. 12, 1999

[54] MOTORCYCLE COMBINATION SUSPENSION SWING ARM AND LIGHT ASSEMBLY ALSO SERVING TO COVER THE AXLE NUTS AND AXLE ADJUSTMENT SCREWS

[76] Inventor: Michael Maldonado, 27111 Mission Hills Dr., San Juan Capistrano, Calif. 92675

[21] Appl. No.: 08/783,651
[22] Filed: Jan. 15, 1997
[51] Int. Cl.⁶ .................................................. B62D 61/02
[52] U.S. Cl. .......................... 180/227; 362/473; 362/549
[58] Field of Search .................................. 180/219, 227; 280/284; 362/473, 549; D26/34

[56] References Cited

U.S. PATENT DOCUMENTS

| | | | |
|---|---|---|---|
| 2,151,485 | 3/1939 | Pawsat | 362/473 |
| 2,231,313 | 2/1941 | Ache | 362/549 |
| 2,630,480 | 3/1953 | Johnson et al. | 362/473 |
| 4,366,880 | 1/1983 | Miller et al. | 180/219 |
| 4,445,705 | 5/1984 | Hayashi et al. | 180/219 |
| 5,566,384 | 10/1996 | Chien | 362/473 |
| 5,615,940 | 4/1997 | Barry | 362/473 |

*Primary Examiner*—Lanna Mai
*Assistant Examiner*—Michael Cuff
*Attorney, Agent, or Firm*—Fuess & Davidenas

[57] ABSTRACT

A motorcycle's running, turn and/or stop lights are located in cavities at the ends of each leg of a "U" shape rear suspension swing arm. Lenses to each light are preferably integrated with the exterior contours of the swing arm, presenting illumination preferably to both the rear and the sides of the motorcycle. Connective wiring is preferably within the swingarm. The lenses are removable to expose both (i) axle nuts and (ii) axle adjustment screws, permitting full adjustment of both. The integrated swingarm and light assembly is completely compatible with, and may suitably be retrofitted to, existing motorcycles where it serves to present a sleek, smooth and compact appearance.

9 Claims, 3 Drawing Sheets

MOTORCYCLE COMBINATION SUSPENSION SWING ARM AND LIGHT ASSEMBLY ALSO SERVING TO COVER THE AXLE NUTS AND AXLE ADJUSTMENT SCREWS

RELATION TO THE RELATED PATENT APPLICATIONS

The present patent application is related to U.S. patent application Ser. No. 08/784,844 filed on an even date herewith for a MOTORCYCLE COMBINATION BRAKE ROTOR AND BELT PULLEY ASSEMBLY to the selfsame Michael Maldonado who is the inventor of the present application. The contents of the related patent application are incorporated herein by reference.

BACKGROUND OF THE INVENTION

1. Field of the Invention

The present invention generally concerns (i) motorcycle suspension swing arms, and (ii) motorcycle tail, turn and/or brake lights.

The present invention particularly concerns (i) integration of motorcycle tail, turn and/or brake lights into a motorcycle suspension swing arm, while (ii) covering and disguising the unsightly appearance of a motorcycle's rear wheel axle nuts and/or axle adjustment screws (nonetheless to providing necessary access to these axle nuts and axle adjustment screws).

2. Description of the Prior Art 2.1 Various Rear Suspension Elements of a Motorcycle, and Various Rear Tail and Turn Signal Lights of a Motorcycle A motorcycle's rear wheel revolves about a central axle. The axle is supported at each end by a swing arm, which swingarm is in turn pivotally connected to the frame of the motorcycle. The swing arm is commonly in the rough shape of a yoke, or the letter "U". Each leg of the swing arm engages a corresponding threaded end of the motorcycle's rear axle, and is held thereto by an axle nut. The perpendicularity of the axle relative to the swingarm, and relative to the motorcycle's frame and the motorcycle's direction of travel, is adjustable by axle adjusting screws operating relative to the swing arm on each side of the axle.

The base of the swing arm is pivotally mounted to the motorcycle's frame along an axis perpendicular to the substantial plane of the motorcycle. By this mounting the swing arm, and the rear wheel attached thereto, may rotate relative to the frame of the motorcycle, moving up and down as the motorcycle travels over uneven terrain.

The swing arm is further attached to the motorcycle frame by one or more springs and/or shock absorbers. These springs and/or shock absorbers are most commonly two in number, and are located one to each side of the rear wheel. The two springs and/or shock absorbers are so located in positions connecting (i) opposed points on the frame that are normally each of to the rear of the motorcycle rider's seat, forward of the rear wheel axle, and high on the frame to (ii) pivot points on the swing arm that are commonly substantially just above the ends of the rear axle. So located, the two springs and/or shock absorbers commonly form an angle of approximately forty-five degrees (45°) with the ground, and with the swing arm which is commonly roughly horizontal.

A motorcycle swing arm need not use two springs and/or two shock absorbers two combined springs and shock absorbers outboard to each side of its rear wheel. The pivoting swing arm may alternatively be connected at a point to the rear of its pivot axis, but forward of the rear wheel to, typically, one combined spring and shock absorber. The single spring and combined shock absorber extends downward to a low point on the frame ahead of the rear wheel. This unitary suspension is called "mono-shock". Because the single spring and shock absorber of the "mono-shock" suspension typically has a long throw, and may be, commensurate with the normally substantial width of the motorcycle, of a large diameter, it functions well to absorb shock. The "mono-shock" suspension is generally considered a more "modern" suspension design than the dual outboard springs and shock absorbers that are still more common.

The "mono-shock" suspension also presents a much "cleaner" appearance to the rear of the motorcycle, hiding as is does the (single) (combined) spring and shock absorber behind, typically, side panels of the motorcycle.

Meanwhile, in accordance with the laws of the several states the United States and of other countries, a motorcycle typically has one or more rear (i) tail lights or (ii) brake lights or (iii) turn signals. Typically the separate functions of these several lights to (i) serve as running lights in darkness, (ii) indicate braking, and (iii) indicate turning—all to the purpose of preventing collisions—have been combined in one or more light fixtures, as is also the case for automobiles. These light fixtures are typically two in number separated to the left, and to the right, of the plane of the rear wheel (as is respectively preferred for indicating left, and for indicating right, turns). These typically two light fixtures are typically mounted to either (i) the two sides of a fender that is mounted to the frame and located above the rear wheel, or else to (ii) the two legs of the swing arm, normally near their ends.

In one particular embodiment of the prior art, running lights have been mounted to the butt ends of each leg of a swingarm. These butt end running lights have also, occasionally, been substantially adapted and conformed to the contours and size of the swing arm terminal portions, appearing somewhat as a compatible rearward-directed "cap" to these portions.

2.2 Philosophy of the Present Invention in Reducing Clutter at the Rear of a Motorcycle Despite the aforementioned improved aesthetics of the rear of a motorcycle having the "mono-shock" suspension with the (typically) single centrally-located combined spring and shock absorber, it is normally accepted unquestioningly that the rear (if not also the front) of a motorcycle commonly appears somewhat "busy" by, at least, present automotive standards. This is because, quite simply, the many essential assemblies of a motor cycle are not often hidden behind body panels, as is the case with automobiles. Also quite commonly the many exposed structures and assemblies on a motorcycle are chrome plated to improve their visual attractiveness, and presentability.

However, massive chrome plating of motorcycle parts and assemblies this is not a total answer. By automotive standards, the rear of a motorcycle looks cluttered, and replete with many exposed assemblies. It may be understood that in the early days of the automobile any of shock absorbers, lights, exhaust headers, exhaust pipes and like assemblies were also located outboard of the central body portion of the automobile. These elements were then also then commonly chrome plated to improve their appearance. Gradually, however, automobiles assumed a more aerodynamic contour, and all these assemblies came to be hidden behind body panels.

A motorcycle is clearly distinct in that, although some have been equipped with full wheel covers and the like that are visually equivalent to automobile body panels, the desirability of maintaining such light weight as promotes performance and maneuverability has precluded any substantial shielding of the rear (i) shock absorbers and/or (ii) lights of a motorcycle.

It is the philosophy of the present invention, and of the invention of the related patent application, that a great deal can be done to make the rear of a motorcycle appear less cluttered, and arguably visually aesthetically better. Moreover, sometimes, as in the present invention, improved aesthetics can also lead to improved function.

SUMMARY OF THE INVENTION

The present invention contemplates an integrated suspension swingarm and light assembly for a motorcycle. Any of a motorcycle's (i) tail, (ii) turn and/or (iii) stop lights are located in cavities near the ends of each leg of the swing arm. Lenses to the cavities are integrated with the exterior contours of the swing arm. Illumination of the lights through the lenses is both to the rear, and to the sides, of the motorcycle.

The cavities also contain (i) axle nuts and/or (ii) axle adjustment screws and/or (iii) axle adjustment plates, which are hidden by the lenses. The lenses are removable to permit both (i) replacement of the lights and (ii) full adjustment of both the axle nuts and axle adjustment screws.

The improved, integrated, motorcycle suspension swingarm and light assembly is completely compatible with, and may suitably be retrofitted to, existing motorcycles.

Accordingly, a one, preferred, embodiment of the invention is used in a motorcycle having a rear wheel axle that is secured by axle nuts, and/or that is adjusted by axle adjusting screws that act against axle adjusting plates. In this environment, the integrated motorcycle suspension swingarm and light assembly is based on a motorcycle suspension swingarm in the substantial shape of a "U". Each end region of each leg of the "U" has and defines a cavity. A light emitter is located within each cavity. A removable lens covers each cavity. When mounted, this lens covers (i) the axle nut and/or the axle adjusting screw and/or the axle adjusting plate, and also (ii) the light emitter. When removed, this lens exposes both (i) the light emitter so as to permit substitution thereof, and also (ii) the axle nut and/or the axle adjusting screws and.or the axle adjusting plate so as to adjustment(s) thereof. The lens preferably covers all elements when mounted, and permits ready access to these same elements when removed.

The removable lens preferably permits emission of light radiation from the light emitter in directions both (i) directly to the rear of the motorcycle and also (ii) directly to the side of the motorcycle.

The swingarm is preferably hollow for the substantial length of each of its legs, with the electrical wiring for each light emitter routed within the hollow. A functional improvement is thus realized in that the wiring is strongly protected by the substantial strength and mass of the swingarm.

The swingarm may be either (i) of the type having and presenting a pivot mounting point for a unitary, or "mono", shock absorber in front of the motorcycle's rear wheel (i.e., a "mono-shock" suspension), or (ii) of the type having and presenting pivot mounting points for two springs and/or two shock absorbers outboard of the motorcycles' rear wheel (i.e., a "conventional" suspension).

These and other aspects and attributes of the present invention will become increasingly clear upon reference to the following drawings and accompanying specification.

DESCRIPTION OF THE PREFERRED EMBODIMENT

Figure 1:
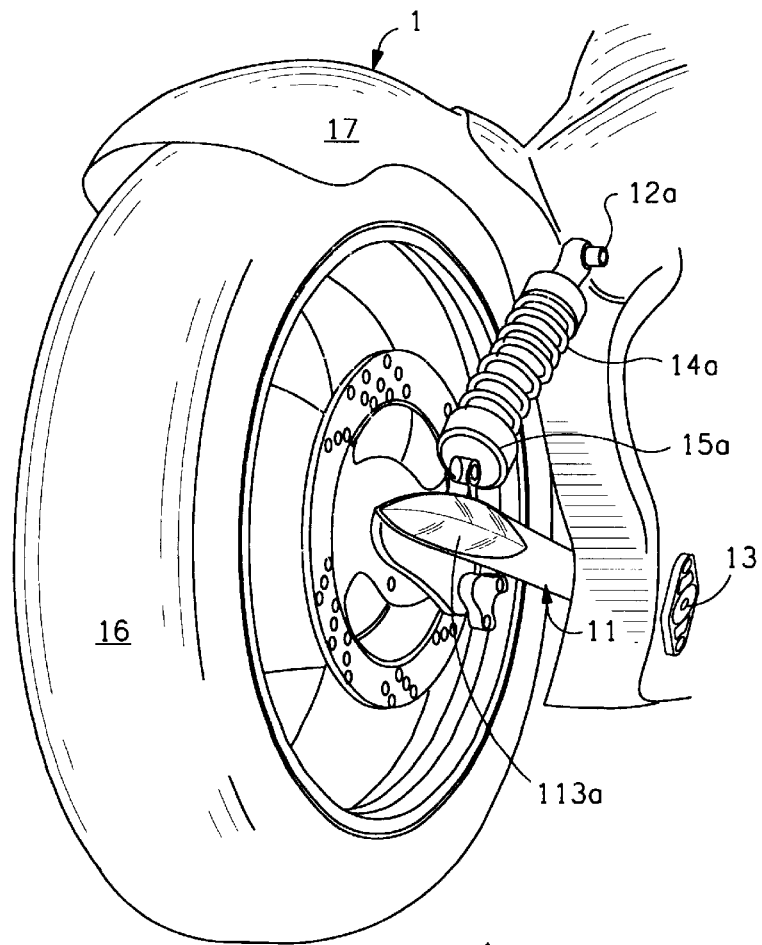
FIG. 1 is a diagrammatic perspective view showing a rear end of a motorcycle equipped with a preferred embodiment of an integrated swingarm and light assembly of the present invention.
Figure 2:
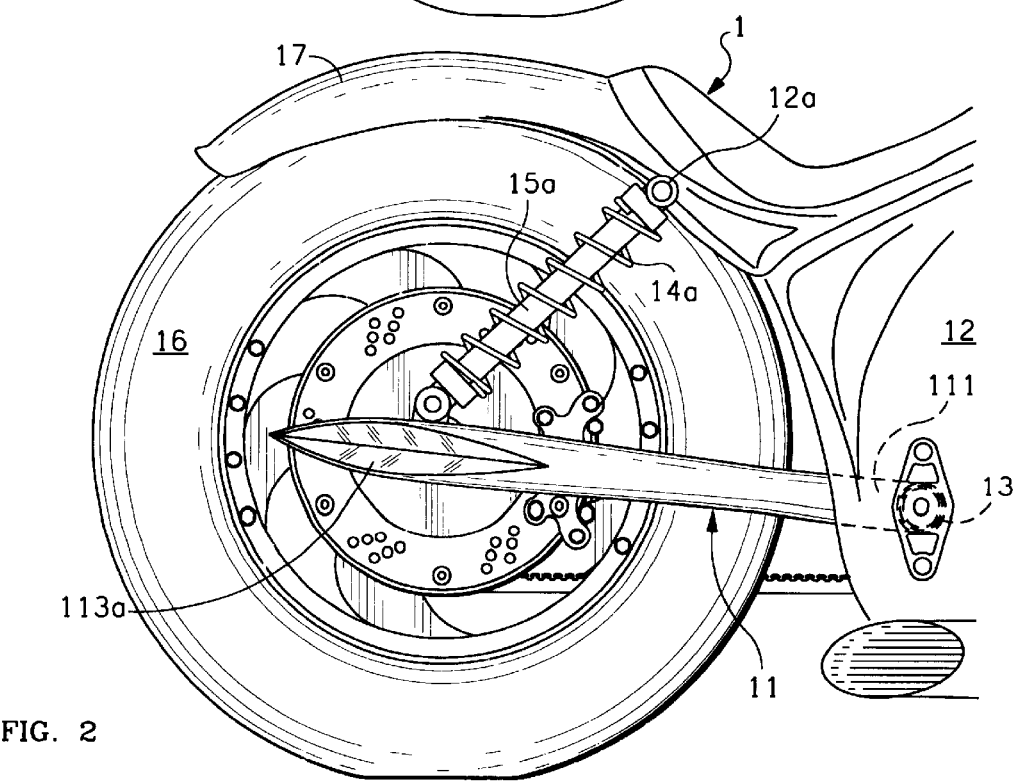
FIG. 2 is a side plan view of the preferred embodiment of the integrated swingarm and light assembly of the present invention previously seen in FIG. 1.

A diagrammatic perspective view of the rear end of a motorcycle 1 equipped with a preferred embodiment of an integrated swingarm and light assembly 11 in accordance with the present invention is shown in FIG. 1. A side plan view of the same motorcycle 1 and preferred embodiment of the integrated swingarm and light assembly 11 is shown in FIG. 2.

The integrated swingarm and light assembly 11 is pivotally secured at a first, forward, end region 111 to the frame 12 of the motorcycle 1 via a mounting 13. The swingarm 11 is able to rotate relative to the frame 12 about its pivot mounting 13 substantially in the imaginary plane of the motorcycle 1 during travel of the motorcycle 1 over uneven terrain.

Rotational movement of the swingarm 11 is resisted by springs 14a, 14b (only spring 14 a is visible), and damped by shock absorbers 15a, 15b (only shock absorber 15a is visible) The springs 14a, 14b, and the shock absorbers 15a, 15b, are pivotally mounted at their upper ends to the frame 12 at points 12a, 12b (only point 12a is visible). The springs 14a, 14b and the shock absorbers 15a, 15b are pivotally connected at their lower ends to the swingarm 11 at points 112a2 and 112a1 of the respective end regions 112a1 and 112b1 of the respective legs, or arms, 112a, 112b. The springs 14a, 14b, and the shock absorbers 15a, 15b serve to establish the rotational position, and the rotational positional limits, of the swingarm 11 about its pivot mounting 13. This movement is, of course, so as to maintain the rear wheel 16 both out of contact with, and at limited extension from, the fender 17.

Figure 7:
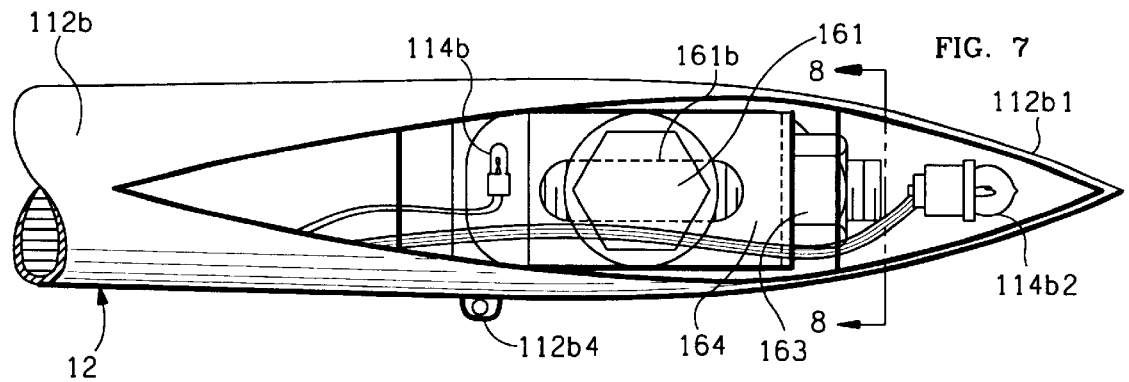
FIG. 7 is a detail side plan view of the end region of a leg of the preferred embodiment of the integrated swingarm and light assembly of the present invention where a lens of the light has been removed, exposing both bulbs and an underlying axle nut and axle adjusting screw of the rear axle of the motorcycle.

In accordance with the present invention the swing arm 11 has and presents at each end region 112a1, 112b1 of its respective legs, or arms, 112a, 112b a respective cavity 112a3, 112b3. These cavities 112a3, 112b3 respectively contain (i) the axle nuts 161a, 161b of the axle 161 of the wheel 16 (axle nuts 161a, 161b and axle 161 not seen in FIGS. 1–4, an exemplary axle nut 161a is best seen in FIG. 7), and also (ii) the axle adjusting screws 162a, 162b of the axle 161 of the wheel 16 (axle adjusting screws 162a, 162b and axle 161 are not seen in FIGS. 1–4; an exemplary axle adjusting screw 162a is best seen in FIG. 7). These cavities 112a3, 112b3 respectively also contain (iii) the light emitters 114a, 114b, of which exemplary light emitters 114a are best seen in FIG. 7.

The cavities 112a3, 112b3 are respectively covered by detachable lenses 113a, 113b, of which lenses exemplary lens 113a is visible in FIGS. 1 and 2.

Figure 3:
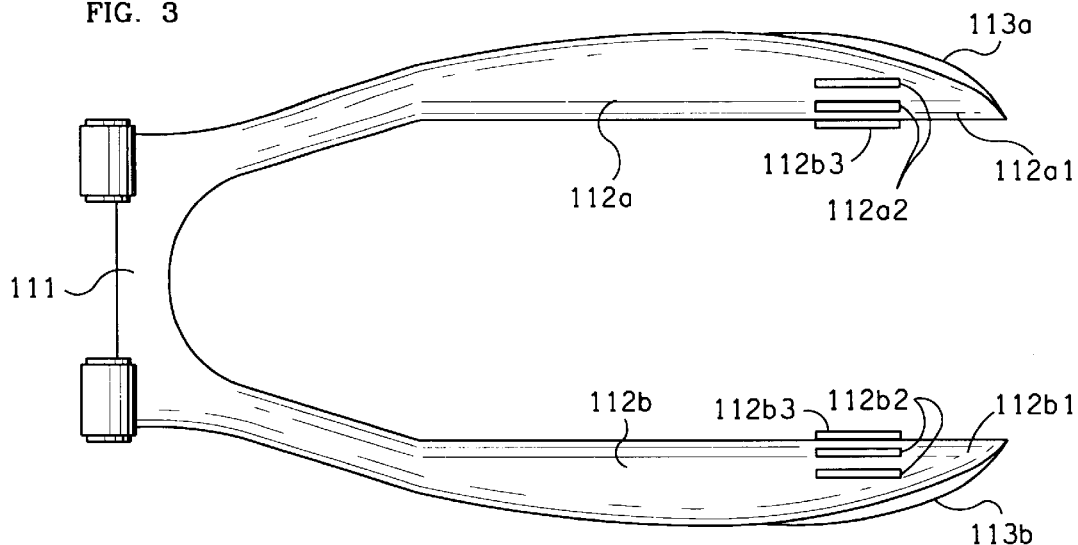
FIG. 3 is a top plan view.

A top plan view of the identical preferred embodiment of the integrated swingarm and light assembly 11 of the present invention as was seen in FIGS. 1 and 2 is shown, now detached, in top view in FIG. 3. The same assembly 111 is shown in side view in FIG. 4. The base 111 of the assembly 11, and its two legs, or arms, 112a, 112b are clearly visible. The overall shape is substantially that of a yoke, or the letter "U". The end region points 112a2, 112b2 to which the shock absorbers 15a, 15b and springs 14a, 14b (shown in FIGS. 1 and 2) are attached are visible. Also visible are pads 112a3 and 112b3 through apertures of which pass the axle 161 (shown in FIGS. 7 and 8). These pads 112a3 and 112b3 make that the swingarm 11 stands off slightly from its affixation to the axle 161, helping to preserve the paint at the side of swingarm and light assembly 11 that faces the tire 16 (shown in FIGS. 1 and 2).

It may again be observed that the lenses 113a, 113b follow the substantial existing exterior three-dimensional contours of the swingarm 11 itself in its end regions 112a1, 112b1.

Figure 4:
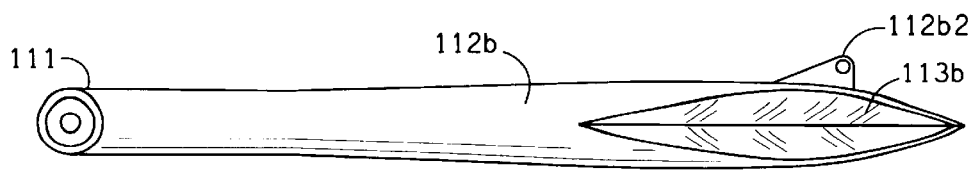
FIG. 4 is a side plan view, of a first variant of the preferred embodiment of the integrated swingarm and light assembly of the present invention, previously also seen in FIGS. 1 and 2, where two shock absorbers mount to pivot points near the ends of the two legs of the swingarm.
Figure 5:
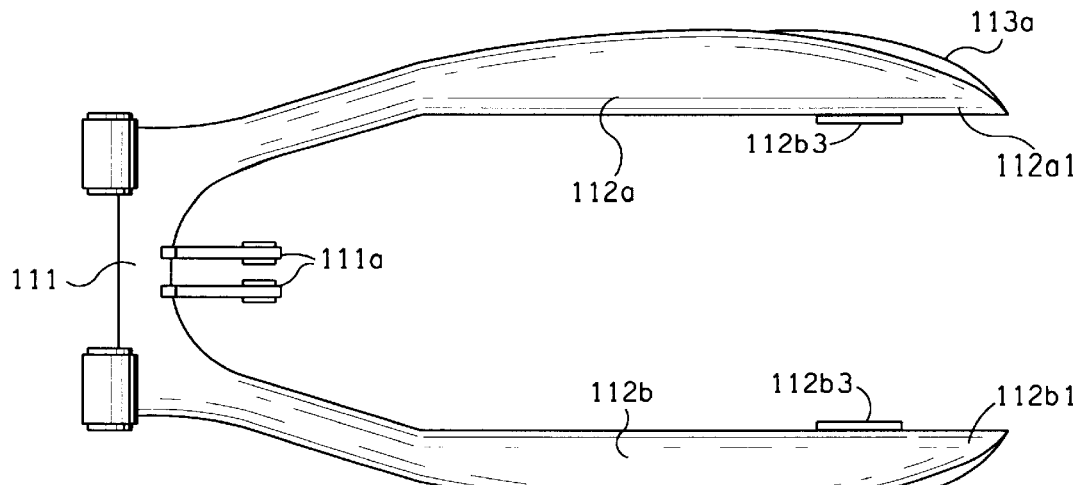
FIG. 5 is a top plan view.
Figure 6:
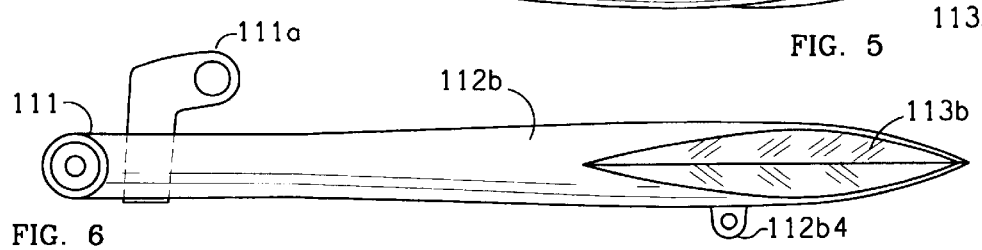
FIG. 6 is a side plan view, of a second variant of the preferred embodiment of the integrated swingarm and light assembly of the present invention where a single shock absorber mounts to a pivot point near to, but displaced from, a pivot axis at the base of the swingarm.

Another, variant, embodiment of the integrated swingarm and light assembly 11 of the present invention is shown in tip view in FIG. 5, and in side view in FIG. 6. Here but a single mounting locations 111a where a single, or "mono", shock absorber and/or spring (not shown) mounts to swingarm 11. No outboard shock absorber mounting brackets 112a2, 112b2 as were previously shown in FIGS. 3 and 4 are present. The axle pads 112a3, 112b3 are still present.

Figure 8:
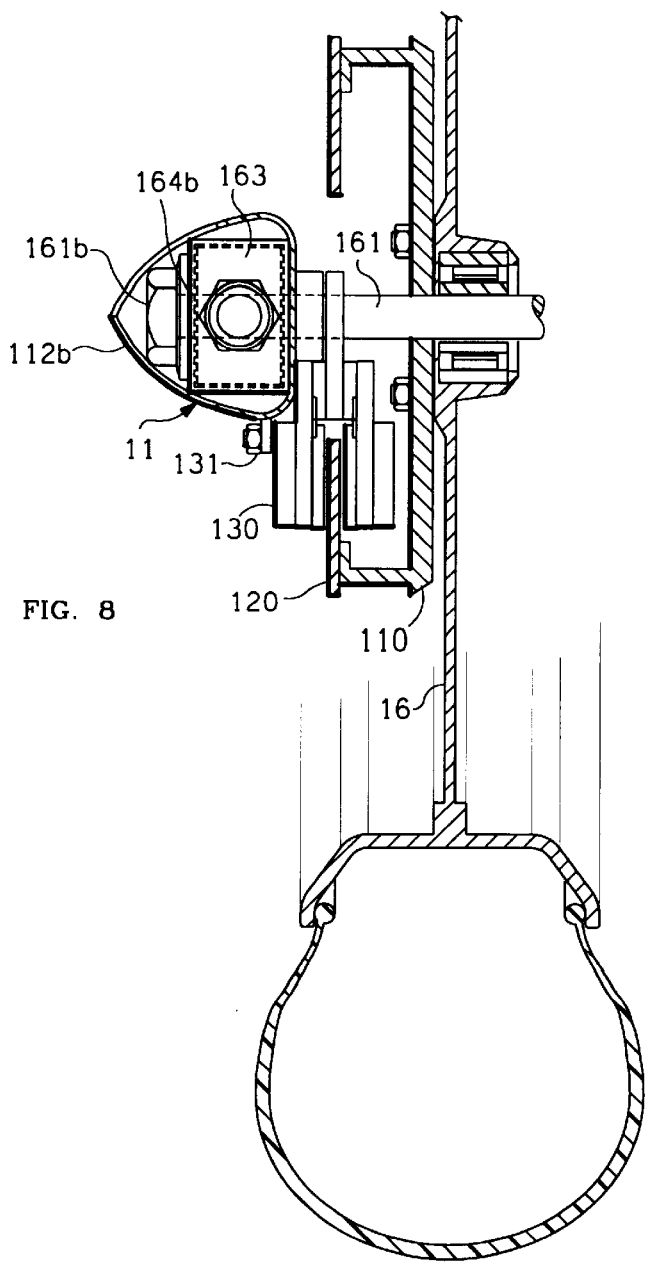
FIG. 8 is a cut-away rear end view, taken along aspect line 8—8 shown in FIG. 7, of one leg of the preferred embodiment of the integrated swingarm and light assembly of the present invention as mounted to the a motorcycle (like as was previously seen in perspective views in FIGS. 1 and 2), the view particularly now showing a location of the assembly relative to a motorcycle combination brake rotor and belt pulley assembly that is the subject of the related patent application.

A new feature (relative to the embodiment of FIGS. 3 and 4) are the tabs 112a4, 112b4 (tab 112b4 shown in FIG. 6). These tabs are used in the affixation of a one end of a disk caliper assembly 130 used in conjunction with a combined belt pulley and disk brake rotor assembly 10 that is the subject of the related patent application, and that is shown in FIG. 8. The use of a swingarm attachment point for a brake caliper assembly is more completely explained in that patent application, the contents of which are incorporated herein by reference.

A detail side plan view of one end region, end region 112b1, of one leg, leg 112b, of the preferred embodiment of the integrated swingarm and light assembly 11 (partial) is shown in detail view in FIG. 7. The lens 113b (shown in FIGS. 4–6) has been removed, exposing light emitters 114b. The light emitters 114b typically consist of a light bulb 114b1, typically an eight watt running light, and a light bulb 114b2, typically an eight watt dual-action bulb that lights more brightly when the motorcycle 1 (shown in FIGS. 1 and 2) is braking.

The lens 113a has been removed in FIG. 7, exposing both bulbs 114. Also exposed are an underlying axle nut 161b, an axle adjusting screw 162b, an axle adjusting nut 163, and an axle adjusting plate 164 presenting an elongate aperture 164b —all located at and about the rear axle 161 of the motorcycle (hidden by cap axle nut 161b in FIG. 7, shown (relative to axle nut 161a) in FIG. 8). The axle nuts 161a, 161b are loosened and tightened to secure the axle 161 to the swingarm 111, the rear wheel 16 rotating about the axle 161.

A cut-away rear end view, taken along aspect line 8—8 shown in FIG. 7, of leg 112a of the preferred embodiment of the integrated swingarm and light assembly 11 of the present invention is shown in FIG. 8. The integrated swingarm and light assembly 11 is mounted to the motorcycle 1, similarly as was previously shown in perspective views in FIGS. 1 and 2. However, the conventional disk brake rotor of FIGS. 1 and 2 (an opposite-wheel-side drive pulley not even having been shown within these FIGS. 1 and 2) is now replaced with the combination brake rotor and belt pulley assembly that is the particular subject of the related patent application. In brief, this assembly combines a brake rotor 110 with a belt pulley 110. A disk brake caliper 130 engages the annular disk brake rotor 120 from its interior.

Nonetheless to this change, the mounting and adjustment of the rear wheel 16 of the motorcycle 1 remains mechanically conventional under the integrated swingarm and light assembly 11. As before, the axle nut 161a is first loosened. The axle adjusting nut 163 is then loosened in order that axle adjusting screw 162a may operate against fixed axle adjusting plate 164 to variably position the end of the axle 161. In this manner the rotation of the wheel 16 may be made true relative to the motorcycle 1. When the axle 161 is properly adjusted by the screw 162a, then the nut 163 is tightened, fixing the axle 161 in fore-aft position. The axle 161 is then tightened to the swingarm 11 by the axle nut 161a.

Upon consideration of the principles and packaging of the integrated swingarm and light assembly 11 of the present invention, it will be obvious to a practitioner of the mechanical design arts that other, further variations and adaptations of the present invention are possible. For example, the light containing cavity might be swept upwards, as may be required to position the rear lights higher off the ground as may be required by the laws of some states. For example, a separate, opaque, plate—possibly of metal construction— might be provided within a swingarm to provide access to a cavity concealing the axle nuts and the axle adjusting screws. This plate might, or might not, be integrated with a lens.

In accordance with these and other possible variations and adaptations of the present invention, the scope of the invention should be determined in accordance with the following claims, only, and not solely in accordance with that embodiment within which the invention has been taught.

What is claimed is:

1. In a motorcycle having a rear wheel secured by axle nuts, an integrated motorcycle suspension swingarm and light assembly comprising:

a motorcycle suspension swingarm in the substantial shape of a "U" having a curvilinear external contour defining at end regions of each leg of the "U" a cavity that is substantially disruptive of the curvilinear external contour;

a light emitter located within each cavity; and a removable lens, shaped in a substantial continuation of existing curvilinear contours of the end regions of each leg of the "U"-shape swingarm, covering each cavity, each which lens when mounted covers an associated axle nut and light emitter and each which lens when removed exposes both the associated light emitter so as to permit substitution thereof, and the associated axle nut so as to permit insertion and removal thereof;

wherein the lens covering each cavity is integral and continuous with the curvilinear external contour of the swingarm, making not only that the swingarm and a light assembly consisting of the light emitters and removable lenses are integrated, but are visually harmoniously so integrated.

2. The integrated motorcycle suspension swingarm and light assembly according to claim 1 in use on a motorcycle also having a rear axle adjustment screw wherein the removable lens to each cavity when mounted further covers the axle adjustment screw, and which lens when removed further exposes the axle adjustment screw so as to permit adjustment thereof.

3. The integrated motorcycle suspension swingarm and light assembly according to claim 1 wherein the removable lens permits emission of light radiation from the light emitter in directions both to the direct rear of the motorcycle and also to the direct side of the motorcycle.

4. The integrated motorcycle suspension swingarm and light assembly according to claim 1 wherein the swingarm is hollow for the substantial length of each of its legs, and wherein the integrated assembly further comprises:

electrical wiring for each light emitter routed within the hollow of a leg of the swingarm.

5. The integrated motorcycle suspension swingarm and light assembly according to claim 4 wherein the swingarm has and presents a pivot mounting point for a unitary shock absorber in front of the motorcycle's rear wheel.

6. The integrated motorcycle suspension swingarm and light assembly according to claim 4 wherein the swingarm has and presents pivot mounting points for two shock absorbers outboard of the motorcycles' rear wheel.

7. The integrated motorcycle suspension swingarm and light assembly according to claim 1 in use on a motorcycle also having a rear axle nut wherein the removable lens to each cavity when mounted further covers the axle nut, and which lens when removed further exposes the axle nut so as to permit the removal thereof.

8. In a motorcycle having a rear wheel adjustable in orientation by axle adjustment screws to each side of a rear axle, an integrated motorcycle suspension swingarm and light assembly comprising:

a motorcycle suspension swingarm in the substantial shape of a "U" having a curvilinear external contour defining at end regions of each leg of the "U" a cavity that is substantially disruptive of the curvilinear external contour;

a light emitter located within each cavity; and a removable lens, shaped in a substantial continuation of existing curvilinear contours of the end regions of each leg of the "U"-shape swingarm, covering each cavity, each which lens when mounted covers an associated axle adjustment screw and light emitter and each which lens when removed exposes both the associated light emitter so as to permit substitution thereof, and the associated axle adjustment screw so as to permit adjustment thereof;

wherein the lens covering each cavity is integral and continuous with the curvilinear external contour of the swingarm, making not only that the swingarm and a light assembly consisting of the light emitters and removable lenses are integrated, but are visually harmoniously so integrated.

9. In a motorcycle having axle nuts and axle adjustment screws to each side of a rear axle, an integrated motorcycle suspension swingarm and light assembly comprising:

a motorcycle suspension swingarm in the substantial shape of a "U" having a curvilinear external contour defining at end regions of each leg of the "U" a cavity that is substantially disruptive of the curvilinear external contour;

a light emitter located within each cavity; and a removable lens, shaped in a substantial continuation of existing curvilinear contours of the end regions of each leg of the "U"-shape swingarm, covering each cavity, each which lens when mounted covers an associated axle nut and an axle adjustment screw and light emitter and each which lens when removed exposes the associated light emitter so as to permit substitution thereof, the associated axle nut so as to permit threading removal and insertion thereof, and the associated axle adjustment screw so as to permit adjustment thereof;

wherein the lens covering each cavity is integral and continuous with the curvilinear external contour of the swingarm, making not only that the swingarm and a light assembly consisting of the light emitters and removable lenses are integrated, but are visually harmoniously so integrated.

\* \* \* \* \*